June 16, 1959     E. K. BONNER, JR., ET AL     2,890,561
RIDING GANG MOWER ATTACHMENT FOR TRACTORS
Filed Sept. 6, 1957     2 Sheets-Sheet 1
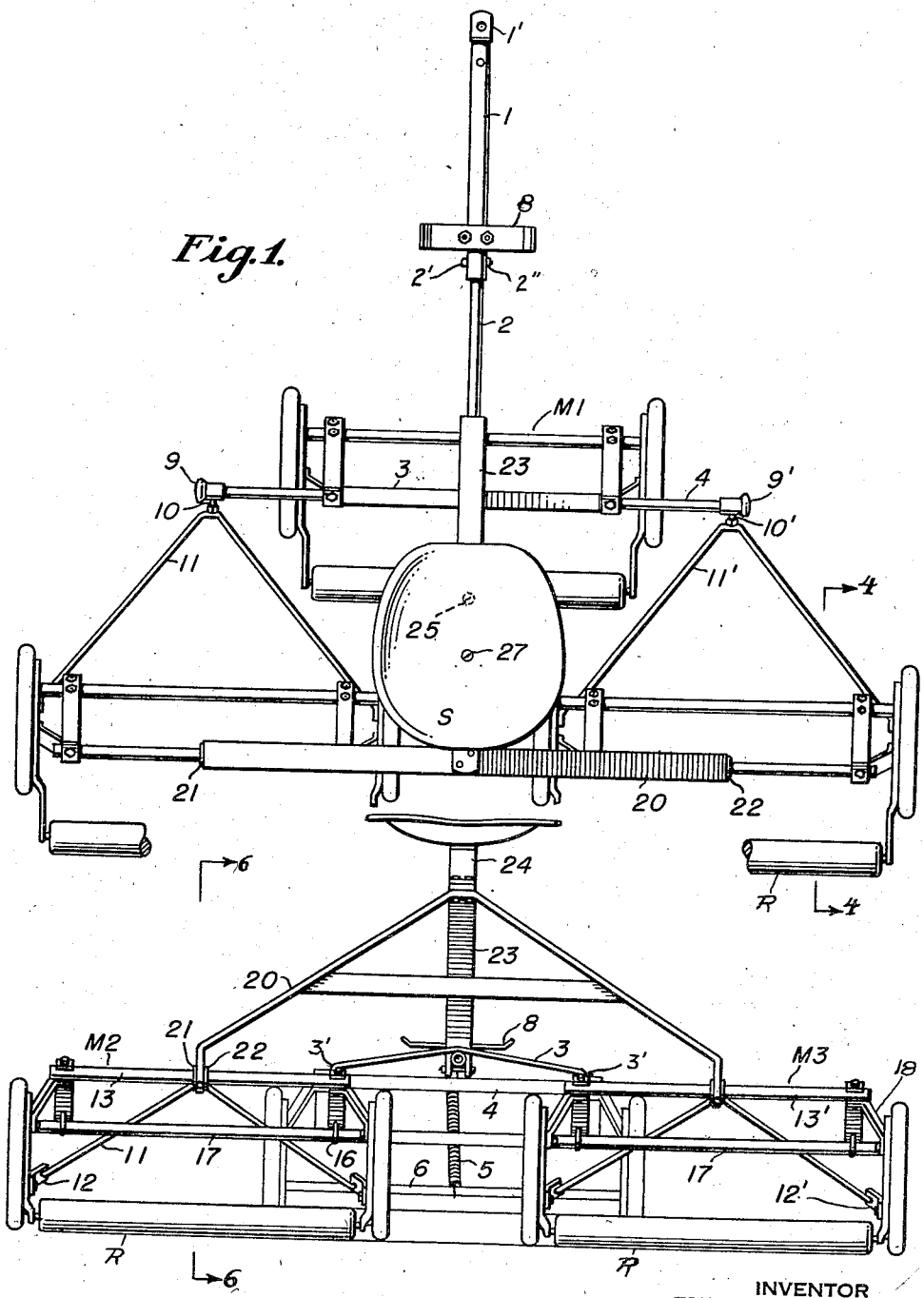
INVENTOR
EDWIN K. BONNER JR.
CHARLES J. WICKERT
ATTORNEY June 16, 1959  E. K. BONNER, JR., ET AL  2,890,561
RIDING GANG MOWER ATTACHMENT FOR TRACTORS
Filed Sept. 6, 1957
2 Sheets-Sheet 2
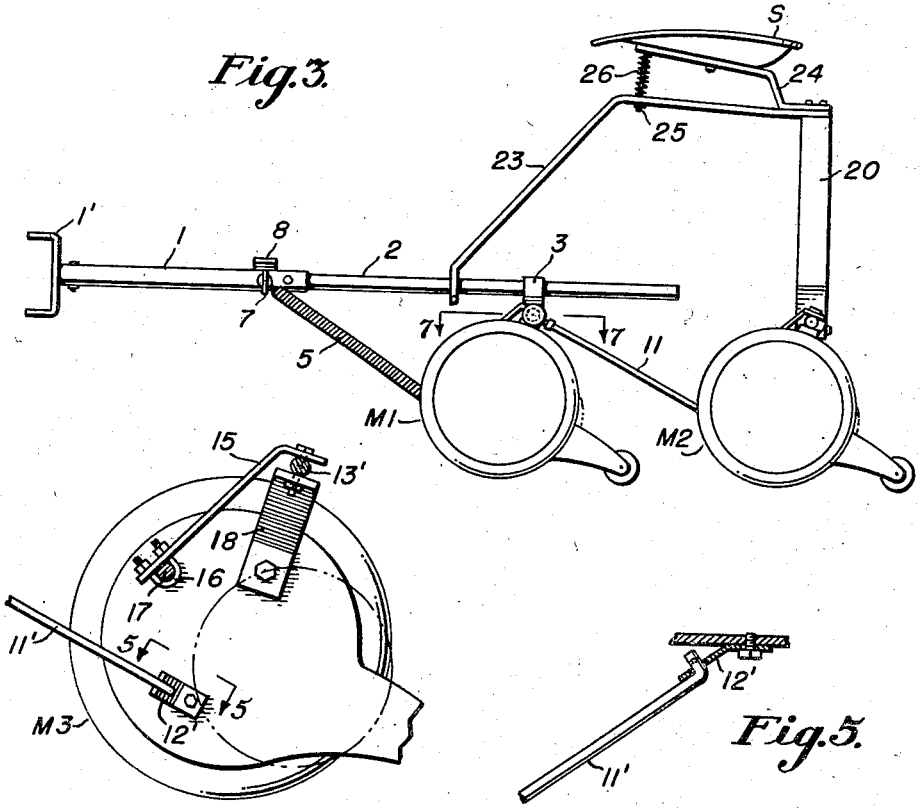
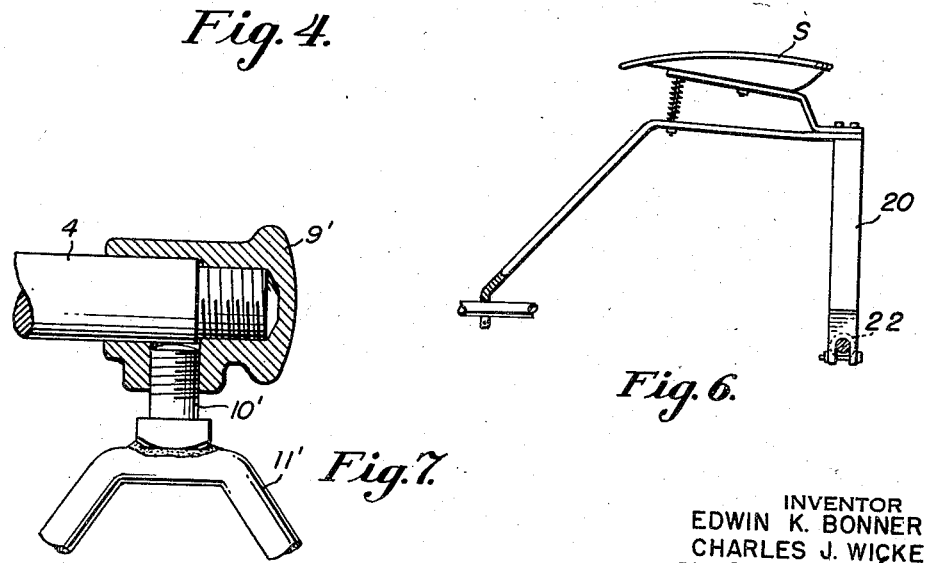
INVENTOR
EDWIN K. BONNER JR.
CHARLES J. WICKERT
BY
ATTORNEY United States Patent Office 2,890,561
Patented June 16, 1959

2,890,561

RIDING GANG MOWER ATTACHMENT FOR TRACTORS

Edwin K. Bonner, Jr., Philadelphia, and Charles J. Wickert, Willow Grove, Pa., assignors to S. L. Allen & Co., Inc., Philadelphia, Pa., a corporation of Pennsylvania Application September 6, 1957, Serial No. 682,368

4 Claims. (Cl. 56—7)

This invention relates to lawn mowing apparatus and particularly to a lawn mower attachment comprising a plurality of reel type lawn mower units and a draft frame adapted for connection to a manually guided "walking" tractor for drawing it over a lawn or the like, traction derived by the mower unit wheels from contact with the ground providing power for rotating the reels of the mower units.

It has been the practice when combining a plurality of such units to secure them to a hitch designed to be connected either in front of or behind the main drive wheels of a tractor which furnishes the motive power for the assembly; the tractor may be a "riding" one providing a seat for the operator or a "walking" tractor which does not, the operator normally following it on foot and guiding it through one or more rearwardly projecting handles with which a throttle control lever and other control mechanisms are associated.

Riding tractors are cumbersome and expensive machines not suitable for use on small and medium sized country home tracts such as are now being developed in many suburban areas whereas walking tractors may be used for a great variety of purposes about such establishments and have gained wide acceptance by home owners, particularly those maintaining vegetable or flower gardens as adjuncts to their homes in addition to relatively extensive lawns. The unavailability, until the present, however, of a gang mower adapted for attachment to a walking tractor but provided with a seat in which the operator may sit while guiding the tractor has been a deterrent to the more widespread use of gang mowers with such tractors and has forced recourse to other means for effecting proper lawn maintenance.

It is therefore an object of this invention to provide a multiple unit gang mower primarily intended for attachment to a walking tractor and equipped with a seat in which the operator can ride while guiding and controlling the assembly.

Another object is to provide a seat support for a multiple gang mower through which the weight of the operator is distributed over a plurality of individual mower units substantially uniformly to thereby enhance the traction of the mower unit wheels which operate the mower reels and thereby improve their effectiveness in this duty, particularly when traveling over wet grass or slippery soil or when unusually heavy turf is being mowed.

A further object is to provide a multiple unit gang mower attachment comprising a seat for the operator yet which is so versatile in connecting a plurality of mower units with a single draft mechanism that each unit is free to move in substantially any required direction to accommodate itself to localized irregularities in the terrain.

Other objects, purposes and advantages of the invention will hereinafter more fully appear or be understood from the following description of a preferred embodiment of it wherein reference will be had to the accompanying drawings, in which the mower units are diagrammatically indicated, standard or conventional parts such as the cutting reels and cooperative "stationary" blades being omitted in certain instances, and in which:

Fig. 1 is a more or less diagrammatic top plan view of a 3-mower-unit gang mower constructed in accordance with the invention;

Fig. 2 is a rear elevation thereof;

Fig. 3 is a side elevation;

Fig. 4 is an enlarged fragmentary vertical section on the line 4—4 in Fig. 1 particularly illustrating structures directly connected to one wheel plate of one of the mower units and typical of like connections made with all such wheel plates;

Fig. 5 is an enlarged fragmentary section on the line 5—5 in Fig. 4 further illustrating a typical connection of a hitch to a mower unit wheel plate;

Fig. 6 is a fragmentary vertical section on the line 6—6 in Fig. 2 and on the scale of the latter illustrating in detail supporting structures for the operator's seat, and Fig. 7 is an enlarged fragmentary section on line 7—7 in Fig. 3 showing in elevation a cross bar element of the mower attachment and the forward end of one of the rear mower unit hitches but equally illustrative of the other.

Referring now more particularly to the drawing the gang mower therein illustrated comprises a draft bar 1 having at its front end a yoke 1' for receiving a vertical king pin to connect the bar to a tractor or other draft mechanism (not shown) but preferably a tractor of a type known as a walking tractor adapted to be guided by handles (not shown) disposed within convenient reach of an operator while seated on seat S hereinafter more fully described. Draft bar 1 is preferably tubular and is provided at its rear end with a tubular extension 2 of slightly smaller diameter. A bolt 2' extending through both parts, with a nut 2" at its end, secures draft bar 1 and extension 2 together in telescopic relationship, a plurality of holes in that part of extension 2 which projects into the draft bar affording capacity for fore-and-aft adjustment of the position of the mower with relation to the tractor, the holes preferably being of diameter greater than the bolt so the tractor can oscillate to a limited extent about the axis of the bar. Fixed to the extension in any suitable way is a transverse tie bar 3 provided with downwardly turned ends 3' through which freely passes an auxiliary draft bar 4 whereby the auxiliary draft bar is susceptible of axial rotation.

A front central mower unit M1 is secured to and below auxiliary draft bar 4 by means hereafter more fully described and a spring 5 connects the customary transverse tie bar 6 of the mower unit with a U-clip 7 on draft bar 1, this clip also securing a foot rest 8 thereto. At the ends of the auxiliary draft bar 4 are caps 9, 9' threaded on the bar in rotatable relation thereto and into which are threaded studs 10, 10' welded to mower hitches 11, 11' (Fig. 7) the diverging arms of which are connected respectively by brackets 12, 12' to the inner faces of the main plates of rear mower units M2, M3. Thus each hitch is afforded capacity for vertical movement about the axis of the draft bar 4 and for lateral oscillating movement about the axis of its stud 10 or 10' as the case may be.

In accordance with the principles described in U.S. Patent 2,796,719, granted to Edwin K. Bonner, Jr., June 25, 1957, it is advisable that these brackets be attached to the mower units respectively at points in a common plane forwardly of the axis of the ground engaging wheels of the unit and between the horizontal plane of said axis and the plane midway between said horizontal plane and the ground level in order that adequate traction may be afforded to the unit wheels without undue vertical oscillation of the unit as a whole in operation.

Each of the mower units M2, M3 is provided with an auxiliary cross bar 13, 13' which are respectively attached to the units by a pair of straps at each end including a stay strap 15 secured by yoke 16 to the conventional transverse tie bar 17 of the unit and another strap 18 attached to the inner face of the main wheel plate of the mower unit at one end and to the auxiliary cross bar and stay strap 15 at the other end; the auxiliary draft bar 4 is secured to mower unit M1 in like manner.

The auxiliary cross bars on the rear mower units and the extension of the forward draft bar afford a three-point bearing support for a seat S on which the operator of the unit may ride. More particularly such support is provided by a main A-frame comprising legs 20 having forks at their lower ends loosely receiving the auxiliary bars 13, 13' respectively and loosely restrained against lateral movement thereon in any suitable way, desirably by washers and deposits of weld metal fused to the bars forming annular projections 21, 22 engageable with the opposite faces of the legs. To the apex of the A-frame there is fixed a forwardly projecting angular stay 23 which by similar forked construction receives at its lower end draft bar extension 2 and above the stay, and bolted to it and the A-frame at their junction there is a seat supporting tongue 24 preferably made from spring steel and restrained at its front end by a bolt 25 surrounded by a compression spring 26 which supplements the normal resiliency of the tongue in supporting seat S under load and while the vehicle is traveling over irregular terrain, the seat being attached to the tongue by a bolt 27 extending through a selected one of a series of holes in the tongue to provide longitudinal adjustability for the seat.

As will be apparent from the foregoing, while the front mower unit M1 is traversing a flat surface it occupies its normal position as illustrated in Fig. 3 but when an obstruction is encountered it can swing with the auxiliary draft bar about the axis of the latter and against the pull of spring 5 without disturbing the other units, the rotatability of the bar in end caps 10, 10' permitting this effect. Furthermore, as the end caps are freely rotatable about the axis of the bar while hitches 11, 11' are in turn rotatable in the caps and the connection of the legs of the A-frame to the auxiliary bars 13, 13' of the rear units is a loose one, each of said units as well as the tractor may tilt independently in substantially any direction to accommodate itself to local irregularities in the terrain over which it is passing and return to normal position upon reaching relatively flat ground without disturbing normal operation or position of the others.

By properly disposing the seat with respect to its supporting tongue any desired distribution of the operator's weight as between the front mower unit and the rear ones can be attained, it usually being preferable that the center of gravity of the occupant of the seat be located in a vertical plane behind the axis of the front unit wheels about two-thirds the distance between the latter and the axes of the rear unit wheels whereby the rear units considered as a group sustain about two-thirds the weight of the operator and the forward one about one-third thereof and the former divide their burden about equally to effect substantially uniform distribution of the operator's weight among all units.

Furthermore since cross bars 4, 13, 13' are located closer to the axes of the drive wheels than to the axes of rollers R of the respective units more weight is imposed on the wheels than on the rollers thereby insuring satisfactory traction.

It is of course obvious that operators assume different positions in work of this kind and vary in distribution of their own body weight and the precise optimum position of the seat longitudinally of its supporting tongue will therefore usually be determined by the individual operator and the seat adjusted accordingly with a view both to greatest efficiency in mowing and to his physical comfort, which is a factor also in determination of the position of the mower gang as a whole with respect to the tractor by which it is drawn, since it is contemplated that the operator be able conveniently to direct and control the tractor manually while riding in the seat.

As a result of the construction and arrangement of the various elements comprised in our mower it constitutes an extremely efficient implement for its intended purpose, capable not only of effecting a smooth and even cut over a relatively wide area despite irregularities in the terrain but enabling the operator to ride in comfort while readily guiding the tractor with which the mower is connected. Additionally, the various parts of the mower are of a character facilitating efficient and economical manufacture and assembly, and affording long service life under the conditions of use to which mowers are normally subjected.

While we have herein described and illustrated one embodiment of the invention it will be understood we do not desire or intend thereby to restrict or confine ourselves thereto in any way as changes and modifications in the form, structure, assembly and relationship of the several elements and components thereof will readily occur to those skilled in the art and may be made if desired without departing from the spirit and scope of the invention as defined in the appended claims.

Having thus described our invention, we claim and desire to protect by Letters Patent of the United States:

1. In a gang mower comprising a plurality of reel type mower units, each unit including a pair of ground engaging wheels rotatable about a horizontal axis, a ground engaging roller rotatable about an axis paralleling and spaced to the rear of the wheel axis and a cross bar paralleling and disposed above and between said axes, a draw bar, an operator's seat, means supporting the seat above said units including a frame having diverging legs each receiving at its end the cross bar of one of the units for axial rotation with respect to the leg and a member extending to and receiving the draw bar, and means associated with each cross bar restraining the corresponding leg from movement longitudinally of the bar, said member maintaining the frame in upright position relatively to the respectively subjacent mower units.

2. A gang mower comprising in combination a pair of transversely aligned rear mower units and a third such unit in front of and parallel thereto considered in the direction of normal travel of the mower, each of said units including a pair of ground wheels rotatable about a horizontal axis, a cross bar paralleling said axis and disposed above and rearwardly thereof and a ground roller behind and below the cross bar, a main draft bar extending parallel to said direction connected to and receiving support from the third unit, the cross bar comprised in said unit being secured to and extending transversely of the main draft bar, draft means interconnecting the rear units respectively with the ends of the third unit cross bar, a seat, and means engaging said main draft bar and the cross bars respectively of said rear mower units and supporting the seat above the units adapted to impose upon each of the several cross bars a portion of the load carried by the seat.

3. A combination as defined in claim 2 in which the seat is disposed above and between the axes of the wheels of the rear units and the axis of the wheels of the front unit and behind the last mentioned axis substantially two-thirds of the distance between it and the axes of the rear units whereby approximately two-thirds of the weight of an occupant of the seat are equally divided between and imposed on the rear units and one-third upon the front unit respectively at points between the ground wheels and roller of each unit.

4. A gang mower comprising laterally spaced rear mower units and a front unit spanning the gap between them, each said unit comprising a pair of ground engaging wheels rotatable about a horizontal axis, a cross bar paralleling and behind such axis and vertically and horizontally spaced therefrom and a ground roller in rear of the cross bar, a main draft bar extending forwardly over the front unit, means connecting said unit therewith for vertical oscillation with respect thereto including means engaging the cross bar of the front unit disposed transversely of the main bar and connected therewith, said last mentioned cross bar having its ends projecting laterally outward beyond the planes of the wheels of the front unit, means connecting each rear unit with the corresponding projecting end of said cross bar for independent oscillation about the axis of said bar and for lateral oscillation in a vertical plane parallel thereto, an operator's seat, and means supporting the seat above the units comprising elements extending respectively to the cross bar of each rear unit and to the main draft bar and loosely engaging each of the former at a point above and between the axis of the unit wheels and its ground roller.

References Cited in the file of this patent

UNITED STATES PATENTS

| | | |
|---|---|---|
| 1,512,439 | Worthington | Oct. 21, 1924 |
| 1,607,378 | Worthington | Nov. 16, 1926 |
| 2,058,048 | Worthington | Oct. 20, 1936 |

FOREIGN PATENTS

| | | |
|---|---|---|
| 109,043 | Great Britain | Jan. 16, 1918 |